United States Patent
Talwar et al.

(10) Patent No.: US 10,490,207 B1
(45) Date of Patent: Nov. 26, 2019

(54) AUTOMATED SPEECH RECOGNITION USING A DYNAMICALLY ADJUSTABLE LISTENING TIMEOUT

(71) Applicant: GM GLOBAL TECHNOLOGY OPERATIONS LLC, Detroit, MI (US)

(72) Inventors: Gaurav Talwar, Novi, MI (US); Kenneth R. Booker, Grosse Pointe Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/977,751

(22) Filed: May 11, 2018

(51) Int. Cl.
*G10L 25/78* (2013.01)
*G10L 15/22* (2006.01)

(52) U.S. Cl.
CPC .............. *G10L 25/78* (2013.01); *G10L 15/22* (2013.01); *G10L 2015/226* (2013.01); *G10L 2025/786* (2013.01)

(58) Field of Classification Search
CPC ... G10L 25/78; G10L 15/22; G10L 2015/226; G10L 2025/786; G10L 15/02; G10L 15/04; G10L 15/05; G10L 15/06; G10L 15/063; G10L 15/065; G10L 15/07; G10L 2015/227; G10L 25/03; G06F 3/16; G06F 3/167

See application file for complete search history.

(56) References Cited

U.S. PATENT DOCUMENTS

| | | | | |
|---|---|---|---|---|
| 9,899,028 | B2 * | 2/2018 | Nakadai | G10L 15/32 |
| 2003/0023432 | A1 * | 1/2003 | Kyomitsu | G10L 15/20 704/231 |
| 2008/0109220 | A1 * | 5/2008 | Kiss | G10L 15/26 704/235 |
| 2009/0222265 | A1 * | 9/2009 | Iwamiya | G10L 15/22 704/246 |
| 2009/0248419 | A1 * | 10/2009 | Spaulding | G10L 15/22 704/275 |
| 2011/0054899 | A1 * | 3/2011 | Phillips | G10L 15/30 704/235 |
| 2013/0253933 | A1 * | 9/2013 | Maruta | G10L 15/00 704/246 |
| 2015/0379985 | A1 * | 12/2015 | Wang | G10L 15/07 704/250 |
| 2016/0232897 | A1 * | 8/2016 | Pereira | G10L 15/22 |
| 2017/0069309 | A1 * | 3/2017 | Aleksic | G10L 15/26 |
| 2017/0085706 | A1 * | 3/2017 | Kim | H04M 3/436 |

(Continued)

*Primary Examiner* — Andrew C Flanders
(74) *Attorney, Agent, or Firm* — Reising Ethington P.C.; David Willoughby

(57) ABSTRACT

A system and method of automated speech recognition using a dynamically-adjustable listening timeout. The method includes: receiving speech signals representing a first speech segment during a first speech listening period; during the first speech listening period, processing the received speech signals representing the first speech segment to determine whether the first speech segment includes one or more insignificant utterances; adjusting a listening timeout in response to the determination of whether the first speech segment includes one or more insignificant utterances; listening for subsequent received speech using the adjusted listening timeout; and performing automatic speech recognition on the received speech signals and/or the subsequently received speech signals.

20 Claims, 6 Drawing Sheets

(56) References Cited

U.S. PATENT DOCUMENTS

| | | | |
|---|---|---|---|
| 2017/0270919 A1* | 9/2017 | Parthasarathi | G10L 15/20 |
| 2017/0286860 A1* | 10/2017 | Chen | G06N 3/0454 |
| 2018/0314552 A1* | 11/2018 | Kim | G06F 3/167 |
| 2018/0358019 A1* | 12/2018 | Mont-Reynaud | G10L 15/32 |

* cited by examiner

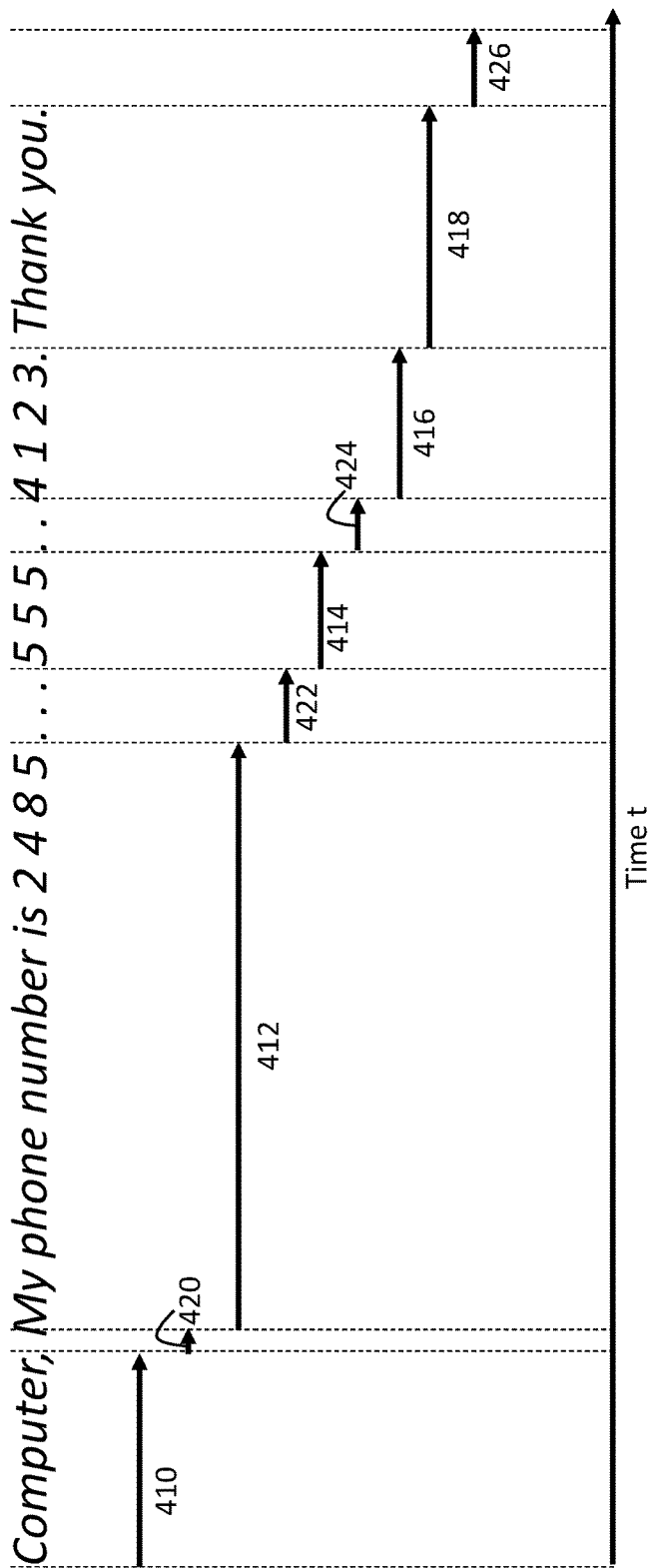

AUTOMATED SPEECH RECOGNITION USING A DYNAMICALLY ADJUSTABLE LISTENING TIMEOUT

INTRODUCTION

The present invention relates to speech recognition and, more particularly, to adjusting speech input timeouts in light of presently-detected characteristics of the input speech.

Automatic speech recognition (ASR) systems can obtain speech from a user and then use speech recognition techniques to interpret the speech in order to respond. The ASR systems can operate through enabling a microphone during a listening period for receiving speech from the user. While soundwaves are being received, the microphone can remain active. Then, when soundwaves stop being received, a timeout can begin and, when the timeout expires, the listening period ends. The timeout is typically statically set. However, certain users may require more time to speak and, thus, using a timeout period of a static length does not lend itself to the variations in speech of various users.

SUMMARY

According to one aspect of the invention, there is provided a method of automated speech recognition using a dynamically-adjustable listening timeout, wherein the method includes: receiving speech signals representing a first speech segment during a first speech listening period; during the first speech listening period, processing the received speech signals representing the first speech segment to determine whether the first speech segment includes one or more insignificant utterances; adjusting a listening timeout in response to the determination of whether the first speech segment includes one or more insignificant utterances; listening for subsequent received speech using the adjusted listening timeout; and performing automatic speech recognition on the received speech signals and/or the subsequently received speech signals.

According to various embodiments, this method may further include any one of the following features or any technically-feasible combination of these features:
- wherein the processing step further comprises determining whether the received speech signals constitute natural language speech or command/control speech;
- the processing step includes using a neural network model that includes one or more hidden layers to determine whether the received speech signals include the one or more insignificant utterances;
- the adjusting step further includes the sub-step of determining an extent to which the listening timeout is adjusted;
- the processing step further includes the sub-step of: in response to determining that the first speech segment includes one or more insignificant utterances, classifying each of the one or more insignificant utterances based on a type of the insignificant utterance;
- at least one of the one or more insignificant utterances is classified as any one of the following: stuttered speech, filler speech, or incomprehensible speech;
- the determination of the extent to which the listening timeout is adjusted is carried out based on the classification of the one or more insignificant utterances;
- the adjusting step includes extending the duration of the listening timeout when it is determined that the first speech segment includes one or more insignificant utterances;
- the subsequently received speech signals represent a second speech segment and wherein the subsequently received speech signals are received during the first speech listening period;
- the subsequently received speech signals representing the second speech segment are received during the first speech listening period;
- the subsequently received speech signals are received during the processing step;
- the subsequently received speech signals representing the second speech segment are received during a second speech listening period, wherein the second speech listening period occurs after the first speech listening period;
- the adjusting step is based on a user speech profile associated with a user that generated the received speech signals, wherein the user speech profile includes information representing a history of previous speech of the user, and wherein at least part of the history of the previous speech of the user includes information pertaining to the user's use of insignificant utterances;
- the processing step is based on the content of the first speech segment; and/or
- the method is performed by a vehicle system module (VSM) included as a part of vehicle electronics of a vehicle.

According to another aspect of the invention, there is provided a method of automated speech recognition using a dynamically-adjustable listening timeout, wherein the method includes: receiving speech signals representing a first speech segment at a client device during a first speech listening period; during the first speech listening period, processing the speech signals representing the first speech segment as the speech signals are received to determine whether the first speech segment includes one or more insignificant utterances; adjusting a listening timeout based on the processing step; after the adjusting step and during the first speech listening period, continuing to listen for subsequent speech signals representing a second speech segment using the adjusted listening timeout; and after an end of the first speech listening period, performing automatic speech recognition on the received speech signals and/or subsequently received speech signals.

According to various embodiments, this method may further include any one of the following features or any technically-feasible combination of these features:
- the end of the first speech listening period is demarcated by an expiration of a last listening timeout; and/or
- the last listening timeout is the adjusted listening timeout.

According to yet another aspect of the invention, there is provided an automatic speech recognition system, including: a client device including: (a) at least one microphone; (b) memory that includes a listening timeout adjustment application; and (c) a processor configured to execute the listening timeout adjustment application, wherein the execution of the listening timeout adjustment application causes the client device to: (i) receive speech signals representing a first speech segment at the at least one microphone during a first speech listening period; (ii) during the first speech listening period, process the received speech signals representing the first speech segment to determine whether the first speech segment includes one or more insignificant utterances; (iii) adjust a listening timeout in response to the determination of whether the first speech segment includes one or more insignificant utterances; (iv) listen for subsequent received speech using the adjusted listening timeout; and (v) perform automatic speech recognition on the received speech signals and/or the subsequently received speech signals.

According to various embodiments, this method may further include the following feature: the client device is a vehicle system module (VSM) included as a part of vehicle electronics of a vehicle.

BRIEF DESCRIPTION OF THE DRAWINGS

One or more embodiments of the invention will hereinafter be described in conjunction with the appended drawings, wherein like designations denote like elements, and wherein:

FIG. 4 is a graph depicting an embodiment of a listening period for receiving speech.

DETAILED DESCRIPTION OF THE ILLUSTRATED EMBODIMENT(S)

Figure 1:
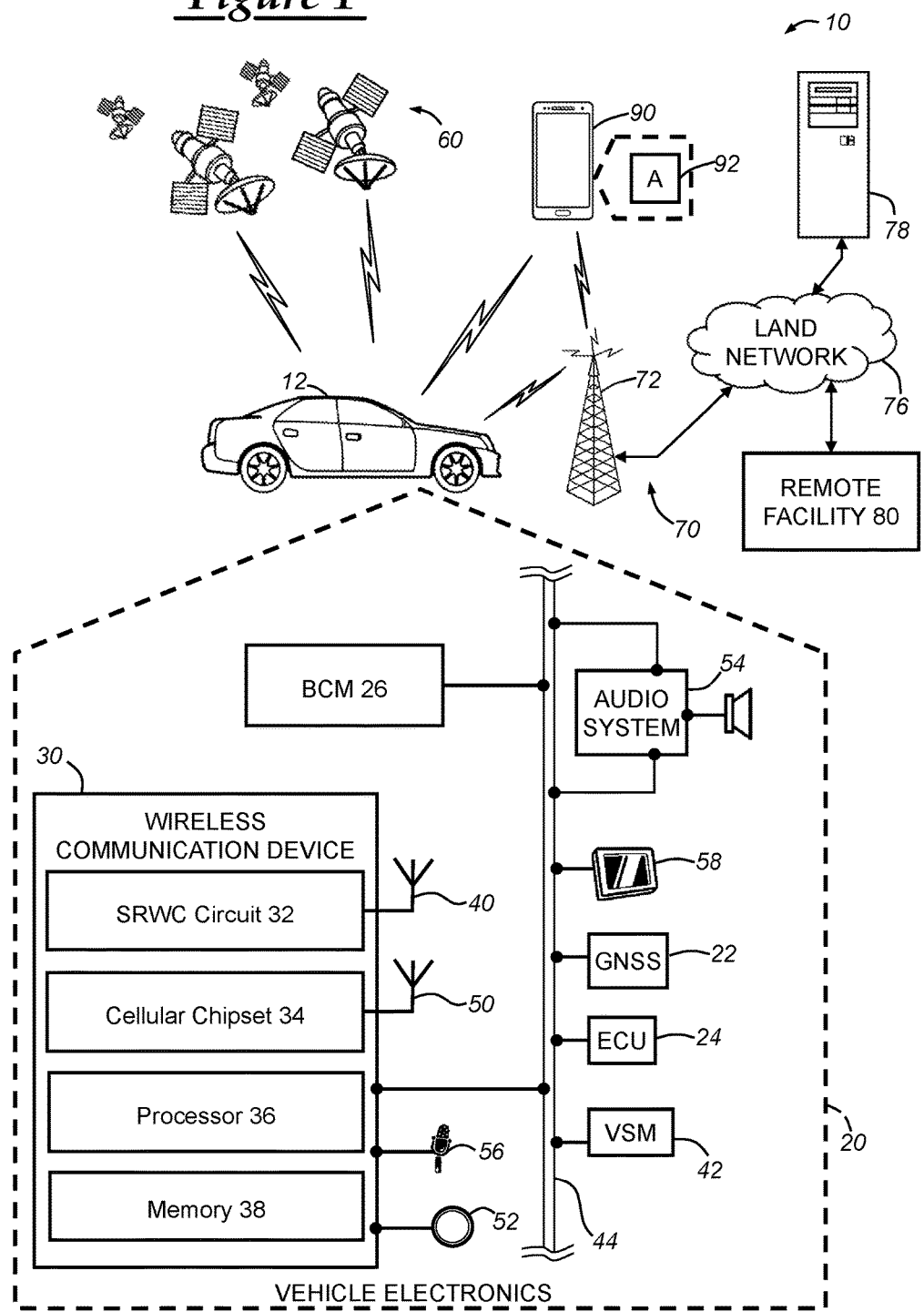
FIG. 1 is a block diagram depicting an embodiment of a communications system that is capable of utilizing the method disclosed herein.

The system and method described below involves adjusting a listening timeout for use during a listening period for receiving speech signals. For example, a speech processing device can be configured to listen for speech signals during a first listening period, process the speech signals during the first listening period and while continuing to listen for speech signals, determine whether the speech signals include insignificant utterances (e.g., stuttered speech, filler speech, or inaudible speech), and adjust a listening timeout for use in a subsequent speech reception process, which can include listening for subsequent speech signals during the rest of the same listening period or during future listening periods. The listening timeout can be used to inform the system and/or method of whether the user has ceased speaking for a period of time (equal to the listening timeout) so that the system and/or method can determine whether the user is still (or is likely still) inputting speech signals into the system. In this way, the microphone can be switched to an inactive or "closed" mode so that additional speech is not received after the listening timeout has expired.

The listening timeout can at least initially be a predetermined length of time and can begin (i.e., start to run) once speech from a user stops being received at a microphone. When the user begins to speak during the running of the listening timeout, the listening timeout is reset and then begins again when the user has ceased speaking once again. Typically, the listening timeout is statically set to a predetermined length of time that can be used to determine whether the listening period should be ended and when the speech input device should be switched to an inactive mode (or a "closed" state/mode). However, the listening timeout of the present system and/or method can be dynamically adjusted (e.g., extended or reduced) based on processing of received speech that was received during a first listening period (or during a speech segment). The system and/or method can process the received speech as the speech is received and, in some embodiments, the received speech can be processed after a certain amount of time has passed, after a certain amount of speech is received, and/or based on various other factors. This processing can be used to determine whether the listening timeout should be adjusted (e.g., extended or reduced) for use in receiving additional speech during the same listening period and/or future listening periods.

As used herein, "a listening period" refers to a period of time in which the microphone is active such that speech can be received at the microphone. As used herein, "speech segment" refers to a segment of speech and can include a plurality of tokens. In other embodiments, the speech segment ca include a single token. As used herein, a "token" refers to a continuous segment of soundwaves representing human speech and, for example, can refer to any one or more of the following: one or more syllables, one or more phonemes, and/or one or more words. Thus, a single listening period can include one or more speech segments, each of which can include one or more tokens. The listening timeout can begin to run after each speech segment is received so that the end of a speech segment occurs at the same time, or very recently prior to, the beginning of the listening timeout.

As mentioned above, the listening timeout can be dynamically adjusted based on received speech from one or more speech segments of the present listening period. For example, a user may begin to speak and this speech can be received at a microphone. As the user's speech is being received at the microphone, the speech signals can be processed to determine whether the speech includes insignificant utterances, such as stuttered tokens (or stammered tokens), filler tokens (e.g., "ummm", "uhhh"), and/or incomprehensible tokens (e.g., soundwaves representing garbled or muddled speech, background speech). Based on this processing and/or determination, the listening timeout can be dynamically adjusted or set. For instance, when a user's speech includes stuttered tokens, the listening timeout can be extended so that the user has more time before the listening period is ended due to the expiration of the listening timeout. This can allow a user who speaks with stuttered tokens more time to speak thereby improving the accuracy and understanding of the speech recognition system. At least in some scenarios, this can improve the user experience by providing a speech recognition system that is more receptive to users of varying speech types due to its ability to dynamically adjust the listening timeout used during the present listening period. While individuals can recognize visual and other cues to determine when a speaker is done speaking, many computerized automatic speech recognition (ASR) systems lack this capability and, thus, need to set a listening timeout as a mechanism for use in determining whether a speaker is done speaking. And, according to various embodiments of the method and system provided herein, the listening timeout can be adjusted (e.g., extended or reduced) in response to determining the speaker desires more time to finish speaking so as to improve the capabilities of the ASR system.

In some embodiments, the processing of the received speech can include determining whether the received speech is being input as a part of a system implementing natural language speech or, in the alternative, whether the received speech is being input as a part of a system implementing a command/control language. Distinguishing between these two types of systems can help inform the system and/or method of whether, and to what extent, the listening timeout should be adjusted. For example, in the case of natural language speech, a user may speak with more filler words and, thus, it may be determined that the listening timeout should be extended so as to allow the user to speak completely without being cut short by the expiration of the listening timeout since, in at least some scenarios, the presence of filler words can indicate that the user needs more time to form their speech.

In some embodiments, the methods and systems below implement a neural network model for purposes of dynamically adjusting a listening timeout for a segment of speech that is to be received. As used herein, a "neural network model" refers to an artificial neural network that includes mapping an input comprised of various factors (or inputs) to an output using at least one hidden layer that interconnects or maps varying input values and/or conditions to an output. In one embodiment, the neural network model can be used to determine whether the received speech includes insignificant utterances, the type of insignificant utterances, and/or the extent to which the insignificant utterances are present in the received speech and/or are likely to be present in anticipated speech that has not yet been received. In other embodiments, various factors can be obtained and inputted into the listening timeout neural network model so as to determine whether and/or to what extent the listening timeout should be adjusted for the present or future listening periods. Other types of models can be used, as the neural network model discussed below is simply one example.

As those skilled in the art will appreciate, the method discussed below can be implemented in a computer program or an application, which can be installed and/or configured to execute on a variety of different client devices, including handheld mobile devices (e.g., smartphones), home automation devices (e.g., intelligent personal assistants such as Amazon™ Alexa™ and Google™ Home), vehicles, and/or any device that can receive and process speech. In a particular embodiment, a vehicle can be used as a speech recognition device to receive and perform speech processing, and a remote speech processing server, such as those included in a vehicle backend services facility, can be used for providing information to the vehicle regarding speech processing and/or the listening timeout adjustment process.

With reference to FIG. 1, there is shown an operating environment that comprises a communications system 10 and that can be used to implement the method disclosed herein. Communications system 10 generally includes a vehicle 12 with a body control module (BCM) 26 and a wireless communications device 30, a constellation of global navigation satellite system (GNSS) satellites 60, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be a client device that can perform speech processing, or which can be used for one or more purposes, such as a remote server accessible (e.g., a remote speech processing server) by vehicle 12. Other such accessible computers 78 can be, for example: a third party server that can be used to provide location services; a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an Internet Protocol (IP) address to the vehicle 12.

Remote facility 80 may be designed to provide the vehicle electronics 20 and mobile device 90 with a number of different system back-end functions through use of one or more electronic servers. For example, remote facility 80 may be used in part to facilitate or coordinate information sent between vehicle 12 and one or more other client devices, such as mobile device 90 or computer 78. In one embodiment, the remote facility 80 can provide speech recognition services, which can include receiving speech signals from a client device and processing the received speech signals using a speech recognition system. Additionally, or alternatively, the remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76.

Remote facility 80 can also include one or more databases that can store account information such as subscriber authentication information, vehicle identifiers, user speech profiles, other profile records, behavioral patterns, speech recognition information, and other pertinent subscriber information. As used herein, speech recognition information includes information that can be used for an automatic speech recognition system, such as for use in the listening timeout adjustment process discussed in detail below. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

The personal mobile device 90 is a mobile device and may include: hardware, software, and/or firmware enabling cellular telecommunications and SRWC as well as other mobile device applications. As used herein, a personal mobile device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC. Personal mobile device 90 can be a client device and can include a processor and memory (e.g., non-transitory computer readable medium configured to operate with the processor) for storing the software, firmware, etc. The personal mobile device's processor and memory may enable various software applications 92, which may be preinstalled or installed by the user (or manufacturer) (e.g., having a software application or graphical user interface (GUI)).

One implementation of a mobile device application 92 may enable receiving speech and processing the received speech using speech recognition techniques, some of which may include speech recognition according to various embodiments of the method discussed herein. For example, the mobile device can include a microphone that enables the reception of speech (i.e., soundwaves representing speech or utterances) that are generated by one or more users. Speech processing can be carried out at the mobile device according to the listening timeout adjustment process discussed below. In some embodiments, application 92 or another mobile device application can include a graphical user interface (GUI) that allows a user to enter credentials, submit credentials for authorization and/or authentication, connect to vehicle 12, view vehicle status information, request vehicle functions to be carried out, and/or configure one or more vehicle settings. Mobile device 90 may communicate with wireless communications device 30 according to one or more SRWC technologies or wired connections, such as a connection using a Universal Serial Bus (USB) cable. Although a single mobile device 90 is shown, communications 10 can include a plurality of mobile devices 90.

Vehicle 12 is depicted in the illustrated embodiment as a passenger car, but it should be appreciated that any other vehicle, including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, engine control unit (ECU) 24, a body control module (BCM) 26, a wireless communications device 30 that can be configured to perform speech recognition processing, other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, ECU 24, BCM 26, wireless communications device 30, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 can be connected to the other VSMs via communications bus 44, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) module 22 receives radio signals from a constellation of GNSS satellites 60. In one embodiment, the GNSS module 22 may be a global positioning system (GPS) module, which may receive GPS signals from a constellation of GPS satellites 60. From these signals, the module 22 can determine vehicle position which may enable the vehicle to determine whether it is at a known location, such as home or workplace. Moreover, GNSS module 22 can provide this location data (e.g., geographical coordinates) to wireless communications device 30, which can then use this data to identify known locations, such as a vehicle operator's home or workplace. Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The location information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Microphone 56 is a vehicle user interface that receives soundwaves and transforms the received soundwaves into electrical signals. The electrical signals can be processed such that the system interprets the user's speech and, depending on the application, the output of the speech recognition system can be used to respond or act in accordance with the user's speech as interpreted by the system. Microphone 56 can be connected to an on-board automated voice processing unit utilizing human-machine interface (HMI) technology known in the art, which can be incorporated into the wireless communications device 30 (e.g., an infotainment unit) or which can be a standalone vehicle system module (VSM) 42. The microphone can be omnidirectional, bidirectional, or unidirectional. Or, in other embodiments, the microphone 56 may represent an array of microphones that can be used together to receive soundwaves from a user. Alternatively or additionally, the vehicle 12 can include a plurality of microphones installed and/or mounted throughout the vehicle so as to enable more information regarding a sound source to be determined, such as the location of the speaking user within the vehicle cabin. In this way, for example, the vehicle 12 can determine whether the driver is speaking (or whether the user speaking is located in the driver's seat). And, although microphone 56 is depicted in the illustrated embodiment of FIG. 1 as being coupled to the wireless communications device 30, those skilled in the art will appreciate that the microphone(s) 56 can be connected to other VSMs of the vehicle, or may be standalone devices that are connected to the communications bus 44 or otherwise communicatively coupled to the other VSMs, such as through short-range wireless communications (SRWC) (e.g., IEEE 802.11 (Wi-Fi™) or IEEE 802.15 (Bluetooth™)).

In some embodiments, the microphone 56 can include or be coupled (e.g., hardwired) to speech processing circuitry that can implement the method discussed below, including the listening timeout adjustment process. The method can be incorporated into the microphone 56, which may be standalone module, or may be implemented in another vehicle system module (VSM) of the vehicle, such as the wireless communications device 30.

Vehicle electronics 20 also includes a number of other vehicle user interfaces that provide vehicle occupants with a means of providing and/or receiving information, including pushbutton(s) 52, audio system 54, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, standalone system or part of the primary vehicle audio system. According to the particular embodiment shown here, audio system 54 is operatively coupled to both vehicle bus 44 and an entertainment bus (not shown) and can provide AM radio, FM radio, satellite radio, CD functionality, and other multimedia functionality. This functionality can be provided in conjunction with, or independent of, an infotainment module. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation. And, any and/or all of these vehicle user interfaces can be incorporated into other client devices discussed herein, including the personal mobile device 90.

Body control module (BCM) 26 is shown in the exemplary embodiment of FIG. 1 as being electrically coupled to communication bus 44. In some embodiments, the BCM 26 may be integrated with or part of a center stack module (CSM) and/or integrated with wireless communications device 30. Or, the BCM and CSM may be separate devices that are connected to one another via bus 44. BCM 26 can include a processor and/or memory, which can be similar to processor 36 and memory 38 of wireless communications device 30, as discussed below. BCM 26 may communicate with wireless communications device 30 and/or one or more vehicle system modules, such as GNSS 22, audio system 54, or other VSMs 42. The processor and memory of BCM 26 can be used to direct or carry out one or more vehicle operations including, for example, controlling central locking, air conditioning, power mirrors, controlling the vehicle ignition or primary mover (e.g., engine, primary propulsion system), and/or controlling various other vehicle modules. BCM 26 may receive data from wireless communications device 30 and, subsequently, send the data to one or more vehicle modules.

Additionally, BCM 26 may provide information corresponding to the vehicle state or of certain vehicle components or systems. For example, the BCM may provide the wireless communications device 30 with information indicating whether the vehicle's ignition is turned on, the gear the vehicle is presently in (i.e. gear state), and/or other information regarding the vehicle. The BCM 26 may be used to determine one or more vehicle states, such as whether the vehicle is powered on, the battery power of a vehicle battery, and/or other vehicle states. These various vehicle states can be obtained by wireless communications device 30 and used as an input in the listening timeout adjustment process, at least in some embodiments.

Wireless communications device 30 is capable of communicating data via short-range wireless communications (SRWC) and, in some embodiments, may be capable of communicating data via cellular network communications. As shown in the exemplary embodiment of FIG. 1, wireless communications device 30 includes an SRWC circuit 32, a cellular chipset 34, a processor 36, memory 38, and antennas 40 and 50. In some embodiments, the wireless communications device 30 may be specifically configured to carry out at least part of the method disclosed herein. In one embodiment, wireless communications device 30 may be a standalone module or, in other embodiments, device 30 may be incorporated or included as a part of one or more other vehicle system modules, such as a center stack module (CSM), BCM 26, an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™ WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication circuit 32 enables the wireless communications device 30 to transmit and receive SRWC signals, such as BLE signals, using antenna 40. The SRWC circuit may allow the device 30 to connect to another SRWC device. Additionally, in some embodiments, the wireless communications device may contain a cellular chipset 34 thereby enabling the device to communicate via one or more cellular protocols, such as those used by cellular carrier system 70. In other embodiments, the vehicle 12 can include a stand-alone telematics unit.

Wireless communications device 30 may enable vehicle 12 to be in communication with one or more remote networks via packet-switched data communication. This packet-switched data communication may be carried out through use of a wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. It should be appreciated that mobile device 90 can include a cellular chipset and/or other communicating means that can be used for packet-switched data communications.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, at least in one embodiment, processor 36 can execute programs or process data to carry out at least a part of the method discussed herein, which can include performing the listening timeout adjustment process discussed below. Memory 38 may include RAM, other temporary powered memory, any non-transitory computer-readable medium (e.g., EEPROM), or any other electronic computer medium that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by BCM 26 or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

Figure 2:
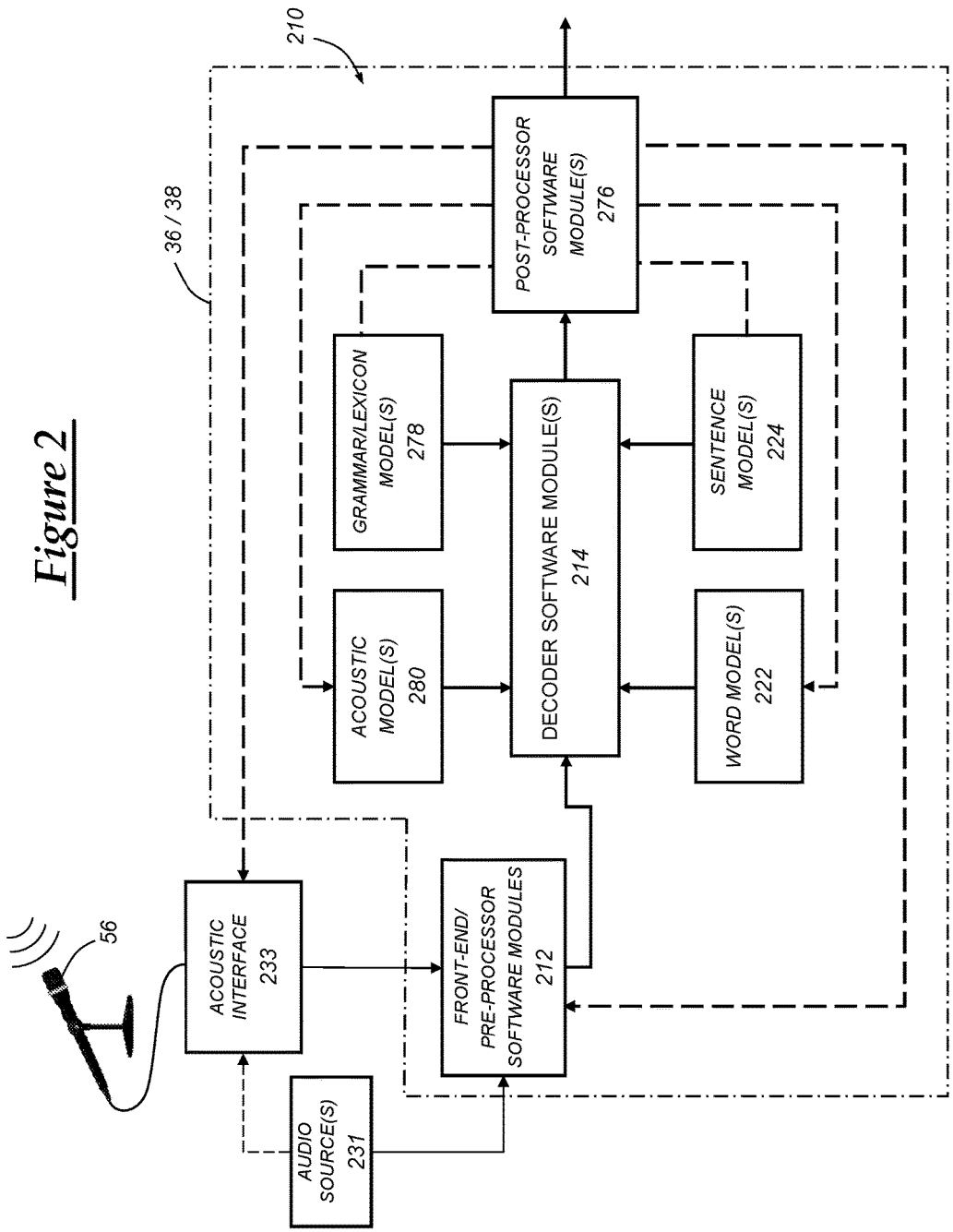
FIG. 2 is a block diagram depicting an embodiment of an automatic speech recognition (ASR) system.

Turning now to FIG. 2, there is shown an illustrative architecture for an automatic speech recognition (ASR) system 210 that can be used, at least in some embodiments, to enable the presently disclosed method. Although the ASR system 210 is discussed below with respect to wireless communications device 30 of vehicle 12, the ASR system 210 can be incorporated into any client device, such as those discussed above including mobile device 90 and computers 78. An ASR system that is similar or the same to ASR system 210 can be incorporated into one or more remote speech processing servers, including one or more servers located at remote facility 80. In general, a vehicle occupant vocally interacts with an automatic speech recognition (ASR) system for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, vehicle device or device function control, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

ASR systems are generally known to those skilled in the art, and FIG. 2 illustrates just one specific illustrative ASR system 210. The system 210 includes a device to receive speech, such as the microphone 56, and an acoustic interface 233, such as a sound card of the wireless communications device 30 having an analog to digital converter to digitize the speech into acoustic data. The system 210 also includes a memory such as the vehicle memory 38 for storing the acoustic data and storing speech recognition software and databases, and a processor such as the vehicle processor 36 to process the acoustic data. The processor functions with the memory and in conjunction with the following modules: one or more front-end processors or pre-processor software modules 212 for parsing streams of the acoustic data of the speech into parametric representations such as acoustic features; one or more decoder software modules 214 for decoding the acoustic features to yield digital subword or word output data corresponding to the input speech utterances; and one or more post-processor software modules 276 for using the output data from the decoder module(s) 214 for any suitable purpose.

The system 210 can also receive speech from any other suitable audio source(s) 231, which can be directly communicated with the pre-processor software module(s) 212 as shown in solid line or indirectly communicated therewith via the acoustic interface 233. The audio source(s) 231 can include, for example, a telephonic source of audio such as a voice mail system, or other telephonic services of any kind.

One or more modules or models can be used as input to the decoder module(s) 214. First, grammar and/or lexicon model(s) 278 can provide rules governing which words (or tokens) can logically follow other words (or tokens) to form valid sentences (or words). In a broad sense, a grammar can define a universe of vocabulary the system 210 expects at any given time in any given ASR mode. For example, if the system 210 is in a training mode for training commands, then the grammar model(s) 278 can include all commands known to and used by the system 210. In another example, if the system 210 is in a main menu mode, then the active grammar model(s) 278 can include all main menu commands expected by the system 210 such as call, dial, exit, delete, directory, or the like. These types of modes with defined word-sets can be use with command/control language. In other embodiments, natural language speech can be used with grammar models that take into consideration all words. Second, acoustic model(s) 280 assist with selection of most likely subwords or words corresponding to input from the pre-processor module(s) 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative illustrative embodiment, some or all of the ASR system 210 can be resident on, and processed using, computing equipment in a location remote from the vehicle 12, such as the computer 78 or the remote facility 80. For example, grammar models, acoustic models, and the like can be stored in memory of one of the servers and/or databases in the remote facility 80 and communicated to the vehicle wireless communications device 30 for in-vehicle speech processing. Similarly, speech recognition software can be processed using processors of one of the remote servers in the remote facility 80. In other words, the ASR system 210 can be resident in the wireless communications device 30, distributed across the computer 78/remote facility 80 and the vehicle 12 in any desired manner, and/or resident at the computer 78 or remote facility 80.

First, acoustic data is extracted from human speech wherein a vehicle occupant speaks into the microphone 56, which converts the utterances into electrical signals and communicates such signals to the acoustic interface 233. A sound-responsive element in the microphone 56 captures the occupant's speech utterances as variations in air pressure and converts the utterances into corresponding variations of analog electrical signals such as direct current or voltage. The acoustic interface 233 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 233 converts the analog electrical signals into digital electronic signals. The digital data are binary bits which are buffered in the memory 38 of wireless communications device 30 and then processed by the processor 36 of wireless communications device 30 or can be processed as they are initially received by the processor 36 in real-time.

Second, the pre-processor module(s) 212 transforms the continuous stream of digital speech data into discrete sequences of acoustic parameters. More specifically, the processor 36 executes the pre-processor module(s) 212 to segment the digital speech data into overlapping phonetic or acoustic frames of, for example, 10-30 millisecond (ms) duration. The frames correspond to acoustic subwords such as syllables, demi-syllables, phones, diphones, phonemes, or the like, all of which are examples of "tokens," as used herein. The pre-processor module(s) 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded.

Third, the processor executes the decoder module(s) 214 to process the incoming feature vectors of each test pattern. The decoder module(s) 214 is also known as a recognition engine or classifier, and uses stored known reference patterns of speech. Like the test patterns, the reference patterns are defined as a concatenation of related acoustic frames and corresponding parameters. The decoder module(s) 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. In a similar manner, individual HMMs for a sequence of subwords can be concatenated to establish single or multiple word HMM. Thereafter, an N-best list of single or multiple word reference patterns and associated parameter values may be generated and further evaluated.

In one example, the speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of one or more words or subwords and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Illustrative parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module(s) 276 receives the output data from the decoder module(s) 214 for any suitable purpose. In one example, the post-processor software module(s) 276 can identify or select one of the reference patterns from the N-best list of single or multiple word reference patterns as recognized speech. In another example, the post-processor module(s) 276 can be used to convert acoustic data into text or digits for use with other aspects of the ASR system or other vehicle systems. In a further example, the post-processor module(s) 276 can be used to provide training feedback to the decoder 214 or pre-processor 212. More specifically, the post-processor 276 can be used to train acoustic models for the decoder module(s) 214, or to train adaptation parameters for the pre-processor module(s) 212.

And, as will be evident from the discussion below, the ASR system can be included in a client device, such as vehicle 12 or mobile device 90, and/or included in a server device, such as a server located at remote facility 80. At least according to some embodiments, the ASR system located at the remote server can include more processing power, as well as more speech recognition information that can be used to provide a more powerful ASR system than that which is located at the client device; however, as those skilled in the art will appreciate, other embodiments exist.

The ASR system or parts thereof can be implemented in a computer program embodied in a computer readable medium and including instructions usable by one or more processors of one or more computers of one or more systems to cause the system(s) to implement the listening timeout adjustment process. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 3A:
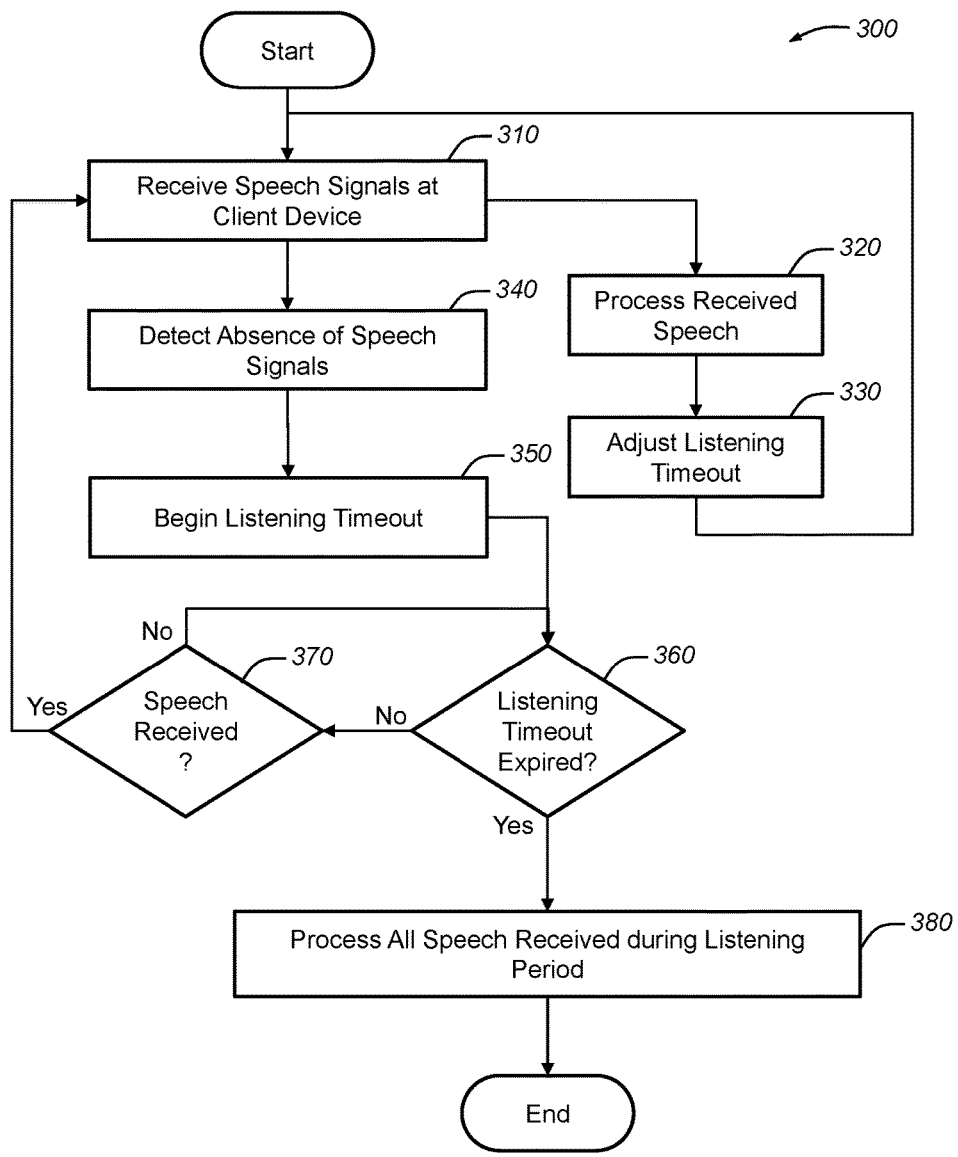
FIGS. 3A and 3B are flowcharts of an embodiment of a method of automated speech recognition using a dynamically-adjustable listening timeout.

With reference to FIG. 3A, there is shown an embodiment of a method 300 of automated speech recognition using a dynamically-adjustable listening timeout. The method 300 includes the listening timeout adjustment process. In many embodiments, the method 300 and/or the listening timeout adjustment process can be implemented on processor 36 of wireless communications device 30 in vehicle 12 and/or may be implemented on another VSM of vehicle 12. The method 300 and/or the listening timeout adjustment process may be implemented on wireless communications device 30 (or other VSM) by configuring the device 30 with a listening timeout adjustment application, which may be in the form of software and/or firmware instructions or a part of a computer program or application. The listening timeout adjustment application can be initially configured and/or compiled at a remote facility, such as remote facility 80, and may be installed on the wireless device 30 (or other client device) via use of a provisioning process or initial manufacturing process.

At least in one embodiment, the listening timeout adjustment application may initially include a set of computer instructions and a set of initial information to be used during the listening timeout adjustment process. The listening timeout adjustment application can be generated and/or initially trained using various training information, including information gathered from previous iterations of speech recognition processes, including natural language understanding and/or rule-based speech recognition processes (e.g., processes used by ASR systems utilizing and/or expecting command/control language). The listening timeout adjustment application can be periodically updated and/or trained so as to improve the listening timeout adjustment process. This can include using inputs and outputs of previous listening timeout adjustment process iterations as training information for the listening timeout adjustment application. Also, in conjunction with the training information, performance indicators can be used that indicate the accuracy, precision, or other outcome of a previous listening timeout adjustment process. Additionally, other training information (e.g., sets of inputs and their corresponding or desired outputs), as well as updated software/firmware instructions can be sent to the client device from a remote server, such as remote facility 80.

The training of the listening timeout adjustment process or application can be carried out before the listening timeout adjustment application is installed on the client device and/or before the listening timeout adjustment application is configured for use in the client device. Moreover, the initial training can supervised training that uses training information (inputs, outputs, and accuracy of outputs) that was obtained from previous speech recognition models. In other embodiments, the initial training can be unsupervised training. The initial training can be carried out at a remote facility, such as remote facility 80, and, when the initial training is complete and the client device is ready to be configured for use, the listening timeout adjustment application can be installed. The listening timeout adjustment application can be included as a part or module of a speech recognition application and may be carried out and/or integrated in a similar manner as the ASR system discussed above.

For purposes of illustration, FIG. 4 will be referred to when describing the method 300 below. FIG. 4 depicts an example of a listening period 400 that includes speech segments 410 through 418, as well as listening timeouts 420 through 426. In one scenario, FIG. 4 represents a single listening period 400 that begins with speech segment 410 and ends after the expiration of the last listening timeout 426 of the listening period 400. Additionally, FIG. 4 depicts corresponding speech that is spoken from a user, such as a passenger or driver of the vehicle 12, and that is received at microphone 56. It should be appreciated that the actual implementation of the ASR system and/or method 300 may include numerous, additional listening timeouts; however, only a few listening timeouts are depicted and referenced for purposes of readability.

Method 300 begins with step 310, wherein speech signals are received at the client device. As mentioned above, the client device may be any of a variety of devices, including vehicle 12, mobile device 90, and/or computer 78; however, the method 300 is discussed below using vehicle 12 as the client device. Vehicle 12 can receive the speech signals using microphone 56 at wireless communications device 30. The speech signals can be sampled so that a digital representation of the speech signals (e.g., digital, electrical signals) can be obtained and used by the processor 36. The sampling can be carried out at speech processing circuitry at the microphone 56, at the wireless communications device 30, or at another VSM of vehicle 12.

In step 320, the received speech signals are processed. This step can be carried out in conjunction with step 310 so that the method can receive speech and process the received speech, while still receiving other speech (or remaining in a listening mode—i.e., the microphone is still active). Then, as more speech continues to be received, the method can continuously process the received speech as it is received. At each point when speech is not being received, then a listening timeout can begin. For example, after a user says "Computer" as shown in speech segment 410 (FIG. 4), the user may pause naturally and/or intentionally. At this point when the user has ceased speaking, a listening timeout can begin—that is, the listening timeout, which may be of a predetermined length of time, may begin to run as depicted by listening timeout 420 of FIG. 4. When the listening timeout expires before user speech is received at the microphone, then the ASR system can switch into an inactive mode (i.e., a non-listening mode for the microphone) in which the microphone is closed, for example. However, when the listening timeout does not run out before user speech is received at the microphone, then the ASR system can remain in an active or listening mode. This latter scenario is depicted in FIG. 4 since the user begins to speak again at speech segment 412 with the words "My phone number is 2485." Although FIG. 4 depicts multiple listening timeouts, the method may actually carry out additional listening timeouts other than those depicted. For example, after any pause in receiving soundwaves (at least that are of sufficient characteristics to be considered inputted sound waves), a listening timeout can begin. This can correspond to periods of time between each token, such as between each word and/or syllable.

Figure 3B:
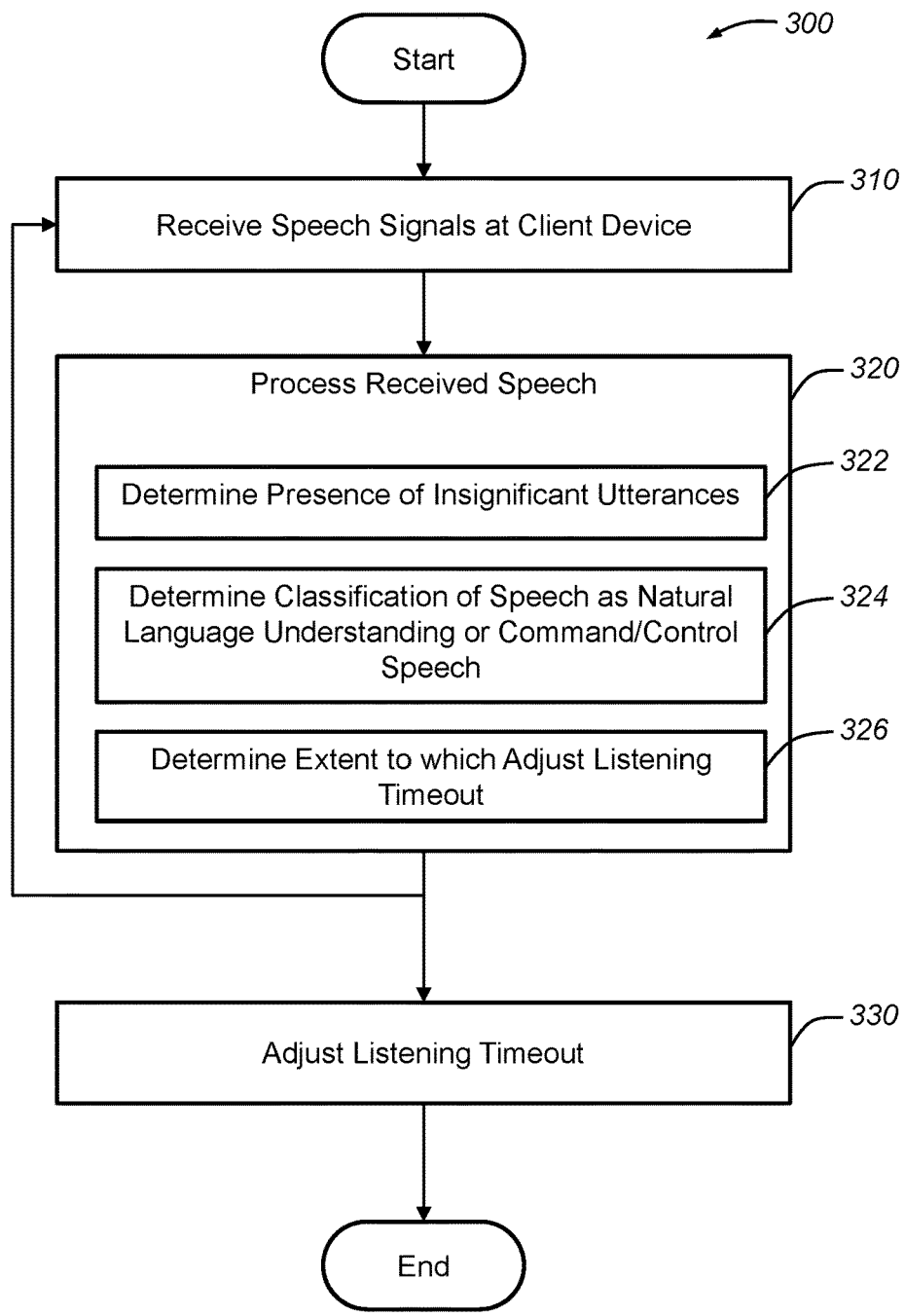

In step 320, the processing can include multiple steps, including, for example, a plurality of determinations. For example, with reference to FIG. 3B, there is shown a portion of the method 300, particularly of steps 310 through 330, along with sub-steps 322 through 326 of step 320. These steps with like reference numerals refer to the corresponding steps of FIG. 3A. In step 320, the processing can include: determining the presence (and/or extent) of insignificant utterances (step 322); determining a classification of the speech (step 324); and/or determining the extent of which to adjust the listening timeout (step 326).

In step 322, the presence of insignificant utterances is determined. As used herein, an "insignificant utterance" is an utterance that is generated as a part of speech from a speaker and that does not provide (or is not interpreted as providing) any words or speech segments that contribute to the communication being conveyed by the speech signals from the speaker. For example, in one embodiment, an insignificant utterance can be a filler word, such as "ummm" or "uhhh," or may be stuttered speech, which can include repeating a token—in many scenarios, speakers may inject filler words into their speeches unintentionally or to indicate that the speaker is thinking and/or going to speak soon thereafter. And, in a particular embodiment, the filler words can be non-semantic filler words that users sometimes say while recalling information for which to include in their subsequent speech (or during other mental processes). In another example, the insignificant utterance can be incomprehensible speech that cannot be comprehended or interpreted by the ASR system. This can include garbled or muddled speech, background speech, other speech that indicates the speaker is struggling to form their speech, interruptive speech (i.e., speech that is directed to another entity or speech that is from another user), and/or various other types of speech. Determining the presence of insignificant utterances can include classifying the received speech, such as through using various ASR techniques. In one embodiment, the ASR system can compare a portion (e.g., a token) of the received speech against another portion of the received speech to determine whether the user uttered the same or substantially similar soundwaves consecutively, which can indicate that the user has stuttered. In one embodiment, it can be determined that two or more consecutive tokens are present in the received speech and, thus, it can be determined that the speech includes insignificant utterances, namely stuttered words—that is, by determining that the speech includes two or more consecutive tokens, it can be determined that the speech includes one or more repeated tokens and, in this way, it can be determined that the speech includes stuttered or stammered tokens. Moreover, the received speech and/or the insignificant tokens (i.e., tokens constituting an insignificant utterance) can be compared to a speech grammar and/or a dictionary (and/or otherwise processed by the ASR system) so that it can be determined whether the identified tokens actually represent a word or set of words that include repeated tokens. For example, the word "tutu" may be constituted by the tokens "tu" and "tu". By comparing these words against a speech grammar and/or dictionary (or set of words used/recognized by the ASR system), it can be determined that, although a repeated token exists, the repeated token may have been intentional. This determination can be further corroborated (or denied) based on other determinations regarding the received speech, the context in which the speech was spoken, and/or one or more other factors.

Additionally, other clues can be used to determine whether the user stuttered or otherwise spoken an insignificant utterance. For example, the amount of time between the repeated tokens can provide insight into whether the speech was intended or the result of an unintentional stutter or interjection of filler words. Additionally, the amount of time between tokens along with the content of the tokens and/or the context in which the speech is received (e.g., a state of the vehicle 12 or other client device) can be used to distinguish whether the speech was intentional or unintentional, and/or whether the speech constituted an insignificant utterance or not. This latter determination can be based on whether the speech was determined to be intentional or unintentional.

For example, the speech spoken during the listening period 400 (FIG. 4) includes recital of a phone number, specifically during speech segments 412-416. At listening timeout 422, the user pauses (as indicated by the ellipsis) so as to, for example, recall or locate the next few digits of the phone number. At least in some embodiments, the method 300 can include processing the received speech (which includes speech segment 412) and determine, based on the content of the received speech (or other factors including the context), whether the user is not done (or is not likely done) inputting speech. In the scenario presented in FIG. 4, the method 300 can recognize that a phone number is being inputted, the received speech as received so far (up until the timeout 422) includes only 4 digits, and that many phone numbers include at least 10 digits. Thus, since only 4 digits are received, the method 300 can determine that more speech is likely to be received. In such a case, the method 300 can determine to extend the listening timeout so as to, for example, allow the speaker more time to finish saying the phone number. In this sense, the method 300 can extend the present (or next) listening timeout. This can also be the case for the listening timeout 424, which may also be extended.

In one embodiment, once the insignificant utterances are detected, the insignificant utterances can be removed from the received speech. In one embodiment, this removal can include redacting the portion of the received speech that included the insignificant utterance. And, in some embodiments, the removal or redaction of these insignificant utterances can be based on the classification of the insignificant utterance. For example, when the insignificant utterance is a filler word, then the entire filler word can be removed from the speech. And, for example, when the insignificant utterance is a stuttered token, only the repeated tokens can be removed. The removal or redaction of these tokens can include, for example, simply disregarding these insignificant tokens, not saving these tokens to memory, and/or removing these tokens from the received speech before speech recognition is performed on the received speech. In another embodiment, other transcription adjustments can be made. And, the removal or redaction of insignificant utterances and/or the other transcription adjustments can be performed during steps 320-326, after step 360 (or after the listening period), and/or at any other time during method 300 after speech is received.

In step 324, it can be determined whether the received speech is classified as natural language speech or command/control speech. As used herein, "natural language speech" refers to speech in which a speaker (i.e., a user of the ASR system) speaks in a natural manner as they would normally when having a conversation. And, as used herein, "command/control speech" refers to speech in which a speaker conforms their speech to a finite vocabulary that is defined for the ASR system. For example, certain ASR systems include a set of commands (e.g., represented by one or more words or tokens) that can be spoken by a user and interpreted by the ASR system as commanding or requesting a particular function to be carried out, which can include simply inputting information into a computerized system connected to the ASR system. For example, a user may use an ASR system to navigate menu options of a user interface and, thus, the ASR system likely expects that the user will speak according to the menu options by, for example, speaking the menu option that the user would like to select. On the other hand, some ASR systems do not define particular commands, but instead are directed to interpreting natural language speech based on the content, combination, order, and/or other properties of the speech. And, in some instances, an ASR system can be responsive to both natural language speech and command/control speech. In such a case, the ASR system can still include a predefined set of commands and, at the same time, can operate to interpret natural language speech that may not include any predefined commands. In one embodiment, the ASR system can generally be receptive to natural language speech, but during certain instances the ASR system may listen for command/control language. For example, a user may power on the client device and, then, ask the ASR system to call a phone number. At the time of powering on the client device, the ASR system may be listening for natural language speech and/or command/control speech. After the user's question, the ASR system may then respond by repeating the phone number as interpreted and then concluding with a question: "Would you like to call this number?" At this point, based on the context of the ASR system, the ASR system expects the user to say "Yes" or "No", which represents an example of command/control speech.

The speech received in step 310 can be classified as natural language speech or command/control speech. For example, a determination can be made as to whether the received speech includes a command, such as whether the received speech includes the words representing a command. When it is determined that the received speech includes a command known to the ASR system, then the received speech can be classified as command/control speech. And, when it is determined that the received speech does not include a command known to the ASR system, then the received speech can be classified as natural language speech; however, this is but one example. Additionally, in some embodiments, it can be determined whether a single word, phoneme, and/or syllable of a predefined command is included in the received speech. For example, the speech received at the point of step 320 (and sub-steps 322-326) may not constitute the entire speech of the listening period (or time in which speech will be received). Thus, it can be determined whether the received speech includes a first part of a predefined command instead of, or in conjunction with, determining whether the received speech includes all of the words of the predefined command.

In other embodiments, this classification of step 324 can be made based on other factors, such as factors relating to the context in which the speech is received (the "contextual factors") and/or factors relating to the properties of the received speech (the "received speech factors"). The contextual factors can include, for example, whether previously-received speech (e.g., received speech from a previous listening period, received speech from a previous speech segment) was classified as natural language speech or command/control speech; information pertaining to the user, such as user profile information, which can indicate, for example, whether the user typically speaks using natural speech language or command/control speech; whether the ASR system is configured to interpret natural language speech and/or command/control speech; the context of the ASR system at the time the speech is spoken; and/or a variety of other factors, including the ASR system's ability to be responsive to command/control speech and/or natural language speech. In one embodiment, this determination may not be based on the particular speech that is being spoken, but may be based on other factors, including, for example, whether the ASR system is configured to interpret natural language speech and/or command/control speech. In such an embodiment, the determination may be made prior to receiving any speech from a user.

In another embodiment, this classification can be made at the time of receiving speech, such as during the listening period 400. In such a case, the received speech factors can include, for example, any of the following factors of the received speech: a pitch of the received speech, a change in pitch of the received speech, a frequency of the received speech, a change of frequency of the received speech, an intensity or loudness of the received speech, the length of the speech, formants of the speech, content of the received speech, a tone of the received speech, a change in tone of the received speech, and/or other acoustic properties of the received speech.

In many scenarios, classifying the speech as natural language speech or command/control speech can aid in determining whether the listening timeout should be adjusted. For example, when natural language speech is being used, then the speaker may need more time to form their speech. Thus, when the received speech is classified as natural language speech, then the listening timeout may be extended. And, when command/control speech is being used, there may be less of a need to extend and/or otherwise adjust the listening timeout; however, this determination can be but one factor used in conjunction with any or all of the other factors discussed herein when determining whether to adjust the listening timeout.

In other embodiments, the ASR system can implement a user speech profile that profiles the speech of a user as the user's speech is collected over time. The user speech profile can include information concerning the manner in which the user speaks, including information describing or representing characteristics that can be useful in making the determinations used in steps 320-326. In one embodiment, these characteristics can include the user's history of use regarding insignificant utterances and/or the classification of the insignificant utterances (e.g., whether they are filler words, stuttered words, or another type of insignificant utterance), the percent or ratio of insignificant utterances as taken with respect to the time of speaking and/or the number of tokens, the user's detected rate of speech (e.g., as represented by tokens/minute), and/or a variety of other information pertaining to a particular user, including the user's speech. The user speech profile can be taken into consideration in making the determinations of steps 320-326. The method 300 continues to step 326.

In step 326, the extent to which the listening timeout is to be adjusted is determined. In some embodiments, this determination can be made in conjunction with and/or as the result of the determinations of steps 322 and 324. This determination can include determining one or more of the following: the extent to which the listening timeout is to be adjusted (e.g., extended, reduced); whether to adjust the listening timeout for only the next occurrence of the listening timeout or for a particular number of occurrences of the listening timeout; and/or whether to adjust the listening timeout for use throughout the rest of the listening period. The extent to which the listening timeout is to be adjusted can be represented by a numerical value, such as in terms of seconds. Once this listening timeout duration is determined, this value can be stored in memory of the ASR system or the vehicle, such as in memory 38 of the wireless communications device 30.

In a particular embodiment, one or more of the determination(s) of steps 320-326 can be made through implementation of a neural network model. Thus, in some embodiments, a neural network model can be used in the listening timeout adjustment process or application. The neural network model can be a shallow neural network or a deep neural network. As used herein, a shallow neural network includes a single hidden layer whereas a deep neural network includes a plurality of hidden layers. Each layer of the neural network may include one or more nodes, each of which may map to one or more other nodes within the same hidden layer, to one or more other nodes within another hidden layer, or to one or more output nodes.

Figure 5:
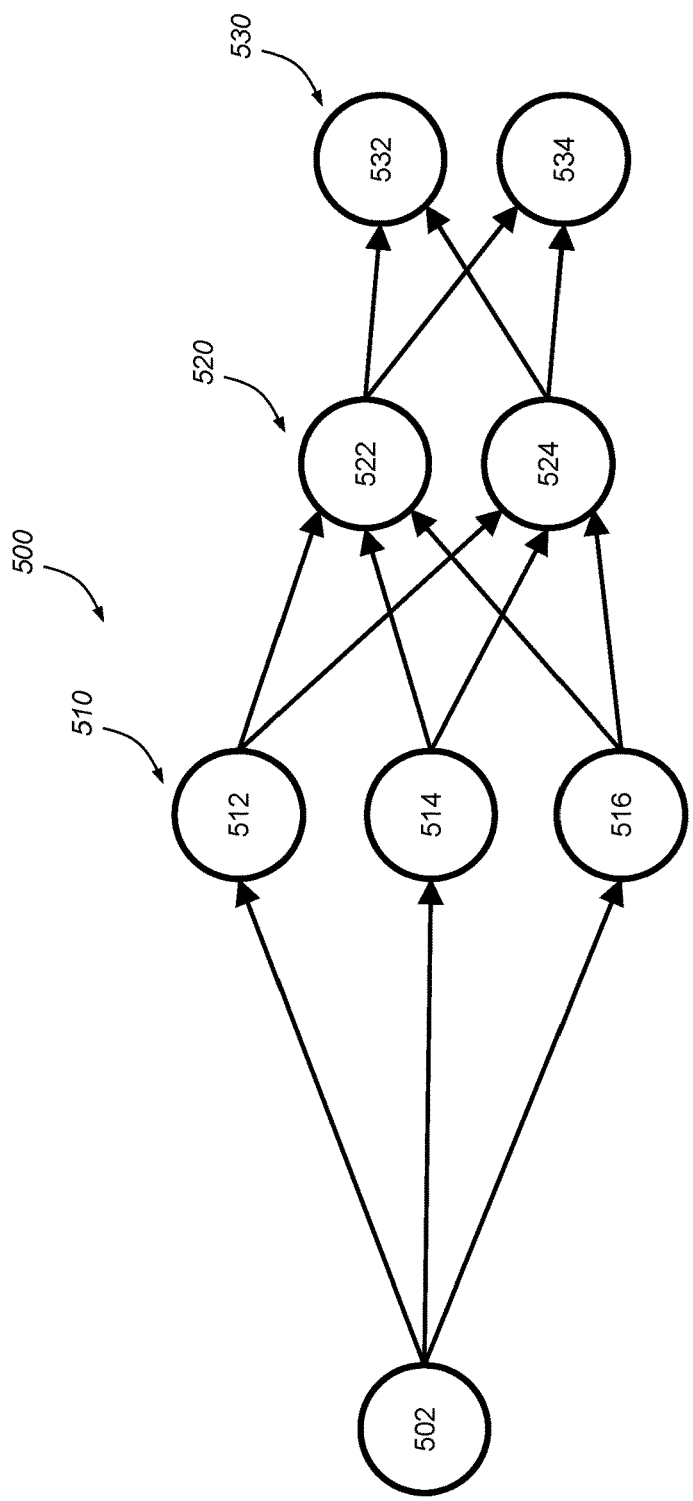
FIG. 5 is a block diagram depicting an embodiment of a neural network model that can be used in carrying out one or more steps of an embodiment of the method.

For example, FIG. 5 depicts an example neural network model 500 that can be used in the listening timeout adjustment process. The neural network model 500 includes an input node 502, output nodes 532 and 534, a first hidden layer 510 that includes nodes 512-516, and a second hidden layer 520 that includes nodes 522 and 524. The input node 502 can correspond to the received speech, which may, and most likely will, change from each iteration of the method 300 to the next. The first hidden layer 510 includes nodes 512-516 and can correspond to the determination(s) of step 322, which includes determining the presence of insignificant utterances. Additionally, in some embodiments, the nodes 512-516 of the first hidden layer 510 can include determining an extent of the insignificant utterances, the type of the insignificant utterance(s), and/or other information as discussed above with respect to step 322. The second hidden layer 520 includes nodes 522-524 and can correspond to the determination(s) of step 324, which includes determining whether the received speech is classified as natural language speech or command/control speech. Additionally, in some embodiments, the nodes 512-516 of the first hidden layer 510 can include any and/or all determinations discussed above with respect to step 324.

The output nodes 532-534 can correspond to whether to adjust the listening timeout and/or to what extent to adjust the listening timeout, including those determinations of step 326 discussed above. In one embodiment, the node 532 can represent no adjustment of the listening timeout, whereas the node 534 can represent adjusting the listening timeout. In the latter case, a listening timeout adjustment value, which represents the extent of the adjustment (e.g., extend, reduce) of the listening timeout, can be included in the output at node 534.

In other embodiments, the neural network model 500 can be used to determine whether the speech is stuttered speech or a normal speech utterance. In such a case, the output node 532 can represent stuttered speech and output node 534 can represent a normal speech utterance. This result (or output) of the neural network model can then be used as a basis in determining whether to extend, reduce, or otherwise adjust the listening timeout. Additionally, in other implementations, a different number of nodes, layers, and/or models can be used. And, in one embodiment, each of the nodes 502-534 can receive certain input information, such as values or other inputs. Such values or inputs can correspond to any and/or all of those determinations discussed above in steps 320 through 326. The method 300 continues to step 330.

With reference back to FIG. 3A, the method 300 continues to step 330. In step 330, the listening timeout is adjusted. This step can be carried out when it is determined that the listening timeout should be adjusted, as discussed above in step 320. The listening timeout can be adjusted by writing the listening timeout adjustment value or a value representing the length of the listening timeout as adjusted to memory, such as memory 38. This can include, at least in some embodiments, overwriting a previously used listening timeout value or duration. Moreover, other information pertaining to the listening timeout and/or use of the listening timeout can be stored in memory, such as the number of times in which to use the adjusted listening timeout (e.g., only during the next instance where a listening timeout is to run, indefinitely). Then, the method 300 continues back to step 310 after step 330.

In step 340, the absence of speech signals is detected. In one embodiment, the absence of sound waves above a particular threshold intensity may result in a detection of the absence of speech signals. In other embodiments, a determination that the received soundwaves are not representative of speech can be used in determining the absence of speech signals. Once it is determined that there is an absence of speech, the method continues to step 350.

In step 350, the listening timeout begins to run. As mentioned above, the listening timeout can be represented by a numerical value or other computer-readable, electronic data. The listening timeout can begin by setting and starting a timer that is configured to run for a period of time corresponding to the listening timeout (i.e., the listening timeout duration). Or, an alarm can be set for a time in the future that is the sum of the present time plus the listening timeout duration. The method 300 continues to step 360.

In step 360, it is determined whether the listening timeout has expired. This can be determined in many ways based on the particular implementation of the running of the listening timeout. When the listening timeout expires, the method continues to step 380. In step 370, if the listening timeout has not expired and subsequent speech is received, the method proceeds back to step 310, where the subsequent speech can be sampled and converted into electrical signals.

In step 380, the speech received during the listening period is processed using the ASR system/device. The speech processing can include any of a variety of speech processing techniques and can be performed locally at the vehicle 12 (or other client device), or the received speech (as represented by electrical signals) can be sent to a remote ASR system, such as those that may be located at remote facility 80 or computer 78. The ASR system can produce a response, which can be a spoken response (using, for example, natural language generation techniques), or can be another response that is responsive to the received speech. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. As an example, the phrase "A, B, and/or C" includes: "A"; "B"; "C"; "A and B"; "A and C"; "B and C"; and "A, B, and C."

The invention claimed is:

1. A method of automated speech recognition using a dynamically-adjustable listening timeout, wherein the method comprises:
   receiving speech signals representing a first speech segment during a first speech listening period;
   during the first speech listening period, processing the received speech signals representing the first speech segment to determine whether the first speech segment includes one or more insignificant utterances, wherein the insignificant utterances are utterances conveyed by the user in the first speech segment that are separate from any words or speech in the first speech segment contributing to communication conveyed by the user in the first speech segment;
adjusting a listening timeout in response to the determination of whether the first speech segment includes one or more insignificant utterances;
listening for subsequent received speech using the adjusted listening timeout; and
performing automatic speech recognition on the received speech signals and/or the subsequently received speech signals.

2. The method of claim 1, wherein the processing step further comprises determining whether the received speech signals constitute natural language speech or command/control speech.

3. The method of claim 2, wherein the processing step includes using a neural network model that includes one or more hidden layers to determine whether the received speech signals include the one or more insignificant utterances.

4. The method of claim 1, wherein the adjusting step further includes the sub-step of determining an extent to which the listening timeout is adjusted.

5. The method of claim 4, wherein the processing step further includes the sub-step of: in response to determining that the first speech segment includes one or more insignificant utterances, classifying each of the one or more insignificant utterances based on a type of the insignificant utterance.

6. The method of claim 5, wherein at least one of the one or more insignificant utterances is classified as any one of the following: stuttered speech, filler speech, or incomprehensible speech.

7. The method of claim 6, wherein the determination of the extent to which the listening timeout is adjusted is carried out based on the classification of the one or more insignificant utterances.

8. The method of claim 1, wherein the adjusting step includes extending the duration of the listening timeout when it is determined that the first speech segment includes one or more insignificant utterances.

9. The method of claim 1, wherein the subsequently received speech signals represent a second speech segment.

10. The method of claim 9, wherein the subsequently received speech signals representing the second speech segment are received during the first speech listening period.

11. The method of claim 10, wherein the subsequently received speech signals are received during the processing step.

12. The method of claim 9, wherein the subsequently received speech signals representing the second speech segment are received during a second speech listening period, wherein the second speech listening period occurs after the first speech listening period.

13. The method of claim 1, wherein the adjusting step is based on a user speech profile associated with a user that generated the received speech signals, wherein the user speech profile includes information representing a history of previous speech of the user, and wherein at least part of the history of the previous speech of the user includes information pertaining to the user's use of insignificant utterances.

14. The method of claim 1, wherein the processing step is based on the content of the first speech segment.

15. The method of claim 1, wherein the method is performed by a vehicle system module (VSM) included as a part of vehicle electronics of a vehicle.

16. A method of automated speech recognition using a dynamically-adjustable listening timeout, wherein the method comprises:
receiving speech signals representing a first speech segment at a client device during a first speech listening period;
during the first speech listening period, processing the speech signals representing the first speech segment as the speech signals are received to determine whether the first speech segment includes one or more insignificant utterances, wherein the insignificant utterances are utterances conveyed by a user in the first speech segment that are separate from any words or speech in the first speech segment contributing to communication conveyed by the user in the first speech segment;
adjusting a listening timeout based on the processing step;
after the adjusting step and during the first speech listening period, continuing to listen for subsequent speech signals representing a second speech segment using the adjusted listening timeout; and
after an end of the first speech listening period, performing automatic speech recognition on the received speech signals and/or subsequently received speech signals.

17. The method of claim 16, wherein the end of the first speech listening period is demarcated by an expiration of a last listening timeout.

18. The method of claim 17, wherein the last listening timeout is the adjusted listening timeout.

19. An automatic speech recognition system, comprising:
a client device comprising:
at least one microphone;
memory that includes a listening timeout adjustment application; and
a processor configured to execute the listening timeout adjustment application, wherein the execution of the listening timeout adjustment application causes the client device to:
receive speech signals representing a first speech segment at the at least one microphone during a first speech listening period;
during the first speech listening period, process the received speech signals representing the first speech segment to determine whether the first speech segment includes one or more insignificant utterances, wherein the insignificant utterances are utterances conveyed by a user in the first speech segment that are separate from any words or speech in the first speech segment contributing to communication conveyed by the user in the first speech segment;
adjust a listening timeout in response to the determination of whether the first speech segment includes one or more insignificant utterances;
listen for subsequent received speech using the adjusted listening timeout; and
perform automatic speech recognition on the received speech signals and/or the subsequently received speech signals.

20. The automatic speech recognition system of claim 19, wherein the client device is a vehicle system module (VSM) included as a part of vehicle electronics of a vehicle.

* * * * *